(12) United States Patent
Matsushima et al.

(10) Patent No.: US 7,477,347 B2
(45) Date of Patent: Jan. 13, 2009

(54) LIQUID CRYSTAL DEVICE AND ELECTRONIC APPARATUS

(75) Inventors: Toshiharu Matsushima, Suwa (JP); Hideki Kaneko, Tottori (JP)

(73) Assignee: Seiko Epson Corporation (JP)

( * ) Notice: Subject to any disclaimer, the term of this patent is extended or adjusted under 35 U.S.C. 154(b) by 535 days.

(21) Appl. No.: 11/348,789

(22) Filed: Feb. 7, 2006

(65) Prior Publication Data

US 2006/0215087 A1    Sep. 28, 2006

(30) Foreign Application Priority Data

Mar. 28, 2005   (JP) .............................. 2005-090719

(51) Int. Cl.
*G02F 1/1335*    (2006.01)
(52) U.S. Cl. ..................... 349/114; 349/115; 349/56
(58) Field of Classification Search ............... 349/56, 349/84, 114, 115, 139
See application file for complete search history.

(56) References Cited

U.S. PATENT DOCUMENTS

| 6,580,480 B2 * | 6/2003 | Baek et al. ............... 349/114 |
| 7,286,192 B2 * | 10/2007 | Lin et al. ...................... 349/41 |
| 2004/0004685 A1 * | 1/2004 | Luo ........................... 349/113 |
| 2006/0274008 A1 * | 12/2006 | Lin et al. ..................... 345/92 |
| 2007/0064182 A1 * | 3/2007 | Lin et al. .................... 349/114 |
| 2007/0268418 A1 * | 11/2007 | Lin et al. ................... 349/114 |
| 2008/0106681 A1 * | 5/2008 | Chi et al. .................... 349/114 |

OTHER PUBLICATIONS

I.H. Yu, et al., Electro-Optic Characteristics of In-Lane Driven Transflective LCD, IDW '04, pp. 167-170.

* cited by examiner

*Primary Examiner*—James P Hughes
(74) *Attorney, Agent, or Firm*—Harness, Dickey & Pierce, P.L.C.

(57) ABSTRACT

A liquid crystal device in which a reflective display region for performing reflective display and a transmissive display region for performing transmissive display are provided in one dot region, includes a first substrate and a second substrate disposed so as to be opposite to each other with a liquid crystal layer interposed therebetween; a first electrode and a second electrode provided on a surface of the first substrate which faces the liquid crystal layer, each of the first and second electrodes applying an in-plane electric field to the liquid crystal layer in the one dot region, and a reflective portion dielectric film provided on the first electrode and/or the second electrode in the reflective display region, the reflective portion dielectric film making a capacitance between the first and second electrodes in the reflective display region smaller than a capacitance between the first and second electrodes in the transmissive display region.

11 Claims, 8 Drawing Sheets

LIQUID CRYSTAL DEVICE AND ELECTRONIC APPARATUS

BACKGROUND

1. Technical Field

The present invention relates to a liquid crystal device and to an electronic apparatus.

2. Related Art

As an example of a liquid crystal device, a liquid crystal device using a transverse electric field mode has been known. In the transverse electric field mode, alignment of liquid crystal molecules is controlled by applying an in-plane electric field to a liquid crystal layer. Specifically, liquid crystal devices using modes, which are called an in-plane switching (IPS) mode and a fringe-field switching (FFS) mode in accordance with a type of an electrode for applying an electric field to liquid crystal, have been known. Recently, a transflective liquid crystal device using a transverse electric field mode has been presented (for example, see 'Electro-optic Characteristics of In-Plane Driven Transflective LCD', I. H. Yu et. al., IDW'04, LCT p 2-5) (hereinafter, referred to as I. H. Yu et. al).

However, in the transflective liquid crystal device, since the distance that display light is transmitted through the liquid crystal layer is different in the reflective and transmissive display modes, a structure is needed to match the electro-optical characteristics in the transmissive and reflective display modes. I. H. Yu et. al notes that in an IPS mode liquid crystal device, liquid crystal molecules disposed over electrodes have more difficulty moving than liquid crystal molecules disposed between the electrodes and suggests using this property to match the electro-optical characteristic in both the transmissive and reflective display modes. However, in such a structure, reflective display is performed over the driving electrodes. As such, the structure has poor freedom in design, such as when attempts are made to differ the area ratio between the reflective display region and the transmissive display region within a single dot region.

SUMMARY

An advantage of some aspects of the invention is that it provides a liquid crystal device of a transverse electric field mode capable of achieving high definition display in both reflective display and transmissive display, increasing the degree of freedom in changing design, and being easily applied to various apparatuses.

According to an aspect of the invention, there is provided a transflective liquid crystal device which includes a first substrate and a second substrate disposed so as to be opposite to each other with a liquid crystal layer interposed therebetween; a first electrode and a second electrode provided on a surface of the first substrate which faces the liquid crystal layer, each of the first and second electrodes applying an in-plane electric field to the liquid crystal layer in the one dot region, and a reflective portion dielectric film provided on the first electrode and/or the second electrode in the reflective display region, the reflective portion dielectric film making a capacitance between the first and second electrodes in the reflective display region smaller than a capacitance between the first and second electrodes in the transmissive display region.

According to this aspect, the effective voltage applied to the liquid crystal layer in the reflective display region can be made to decrease by the capacitance applied between the electrodes by means of the reflective portion dielectric film. Accordingly, even when the corresponding electrode has the same structure in each of the transmissive display region and the reflective display region and the same voltage is applied thereto, only the effective voltage applied to the liquid crystal layer in the reflective display region can be easily adjusted by adjusting the relative dielectric constant or thickness of the reflective portion dielectric film, so that it is possible to make the electro-optical characteristic uniform in each of the reflective display and the transmissive display. As a result, the difference between the visual quality in the transmissive display and the visual quality in the reflective display can be prevented from being generated, so that it is possible to achieve a liquid crystal device having an excellent display quality.

In addition, in the liquid crystal device according to this aspect, even when the ratio between the reflective display region and the transmissive display region (area ratio) is changed in accordance with-the used purpose, only a plane area of the reflective layer for reflecting external light and a plane area of reflective portion dielectric film corresponding to the plane area of the reflective layer are changed, so that it is possible to cope with the variation of the area ratio between the reflective display region and the transmissive display region. That is, since the electrode structure does not need to be changed when the area ratio between the reflective display region and the transmissive display region is changed, the degree of freedom in changing design may be markedly increased, and the liquid crystal device can be easily applied to various electronic apparatuses.

According to another aspect of the invention, there is provided a liquid crystal device which includes a first substrate and a second substrate disposed so as to be opposite to each other with a liquid crystal layer interposed therebetween, and in which a reflective display region for performing reflective display and a transmissive display region for performing transmissive display are provided in one dot region. Further, a first electrode and a second electrode are provided at the side of the first substrate toward the liquid crystal layer, each of the first and second electrodes applying an electric field to the liquid crystal layer in the one dot region in a substantially horizontal direction to a surface of the first substrate. Furthermore, a dielectric film is provided on the first electrode and/or the second electrode in the reflective display region, the dielectric film making an effective voltage applied to liquid crystal between the first and second electrodes in the reflective display region smaller than an effective voltage applied to liquid crystal between the first and second electrodes in the transmissive display region.

Preferably, a transmissive portion dielectric film is provided on the first electrode and/or the second electrode in the transmissive display region. In addition, a dielectric film provided on the first electrode and/or the second electrode of the reflective display region including the reflective portion dielectric film has a smaller relative dielectric constant than a relative dielectric constant of a dielectric film provided on the first electrode and/or the second electrode of the transmissive display region.

In this case, it is possible to easily control the effective voltage applied to the liquid crystal layer in the reflective display region and the effective voltage applied to the liquid crystal layer in the transmissive display region. Accordingly, it is possible to achieve the same effects as the above-mentioned liquid crystal device.

Preferably, the reflective portion dielectric film does not apply a phase difference to light transmitting the corresponding reflective portion dielectric film. In this structure, the electro-optical characteristic of the reflective display can be adjusted by means of the adjustment of the thickness or relative dielectric constant of the reflective portion dielectric film without considering the polarized state of the light which transmits the liquid crystal layer and is then used as the display light. The electro-optical characteristic of the liquid crystal device can be easily adjusted.

Preferably, a voltage applied to the liquid crystal layer in the reflective display region is substantially half of a voltage applied to the liquid crystal layer in the transmissive display region. According to this aspect, since a rotational angle of liquid crystal molecules with respect to the applied voltage in the reflective display region can become half of a rotational angle in the transmissive display region, the display light at the time of the reflective display transmitting the liquid crystal layer twice and the display light at the time of the transmissive display transmitting the liquid crystal layer once can be easily made to be uniform in a polarized state. Accordingly, it is possible to make the visual quality uniform in each of the reflective display and the transmissive display.

Preferably, each of the first and second electrodes has an electrode type of an IPS (in-plane switching) mode. That is, it is possible to use a transverse electric field mode having the structure in which the first electrode and the second electrode are opposite to each other on the same layer in plan view. For example, each of the first and second electrodes has a substantially comb-like shape in plan view, and the strip electrodes forming the comb-like portion can be disposed so as to engage with each other.

Preferably, each of the first and second electrodes has an electrode type of an FFS (fringe-filed switching) mode. For example, one of the first and second electrodes is formed on the entire surface of the corresponding substrate, and the other has a comb-like shape. The other electrode forming the comb-like shape in plan view can be formed on the dielectric film that is formed on one electrode formed on the entire surface of the corresponding substrate.

In the liquid crystal device according to the aspect of the invention, the reflective layer performing the reflective display is partially provided in the dot region, but is generally formed of a metal film. Therefore, in the liquid crystal device which uses the IPS mode, if the first electrode, the second electrode, and the reflective layer are formed on the same substrate, there is concern in that distortion may occur in an electric field generated between the first electrode and the second electrode. In the meantime, in the liquid crystal device which uses the FFS mode, since one of the first and second electrodes is formed on the entire surface of the corresponding substrate, even when the reflective layer is provided near the electrode formed on the entire surface of the corresponding substrate, the distortion does not occur in the electric field. Accordingly, if the electrode type of the FFS mode is used, the structure of the liquid crystal device can be simplified, so that the liquid crystal device can be easily performed.

Preferably, the reflective portion dielectric film is buried in a concave portion formed on the first substrate. According to this aspect, it is possible to prevent the unevenness (step) from being generated on the surface of the first substrate toward the liquid crystal layer due to the thickness of the reflective portion dielectric film that is selectively formed on only the reflective display region. Thereby, it is possible to make the thickness of the liquid crystal layer uniform in each of the reflective display region and the transmissive display region, so that it is possible to make the electro-optical characteristics similar to each other in the reflective display region and the transmissive display region.

Preferably, a depth of the concave portion is substantially equal to a thickness of the reflective portion dielectric film. According to this aspect, it is possible to further improve the flatness of the surface of the first substrate.

Preferably, the first substrate is formed by sequentially laminating an interlayer insulating film, the first and second electrodes, and the reflective portion dielectric film on a base, and the concave portion is formed on a surface of the interlayer insulating film.

Preferably, the first substrate is formed by sequentially laminating the first and second electrodes and the reflective portion dielectric film on a base, and the concave portion is formed on a surface of the base.

The concave portion may be formed on the interlayer insulating film where the first electrode and the second electrode are formed, and may be formed on the insulating film provided on the lower layer of the interlayer insulating film. Alternatively, the concave portion may be provided on the base.

According to a further aspect of the invention, there is provided an electronic apparatus including the liquid crystal device. According to this aspect, it is possible to provide an electronic apparatus having a display unit with bright and high contrast.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a liquid crystal device according to a first embodiment of the invention will be described with reference to the accompanying drawings. The liquid crystal device according to the present embodiment is a liquid crystal device that uses an in-plane switching (IPS) mode among transverse electric field modes in which image display is performed by applying an in-plane electric field (transverse electric field) to liquid crystal to control alignment of liquid crystal molecules.

In addition, the liquid crystal device according to the present embodiment is a color liquid crystal device that has color filters provided on a substrate. The liquid crystal device has a structure in which one pixel is composed of three dots that output light of three primary colors including R (red), G (green), and B (blue), respectively. Accordingly, in the following description, a display region serving as a minimum unit constituting display is called 'a dot region', and a display region composed of a set of dots (corresponding to R, G, and B) is called 'a pixel region'.

Figure 1:
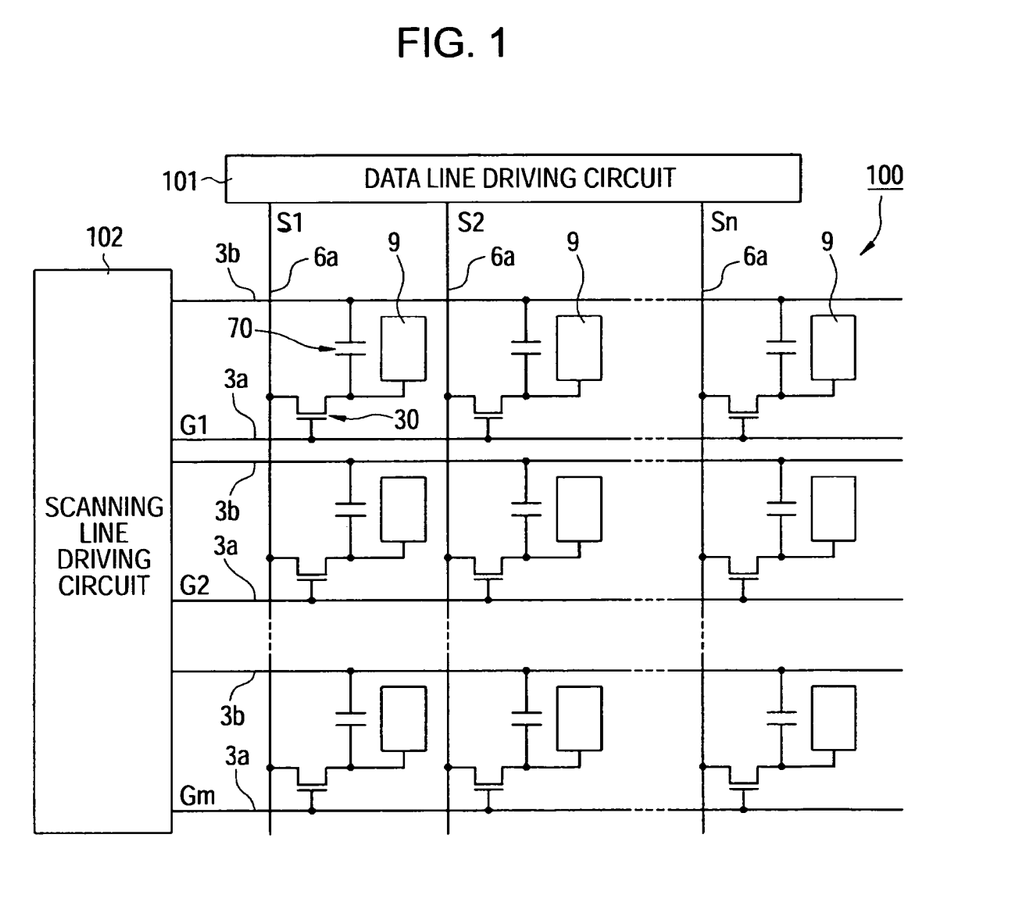
FIG. 1 is a diagram illustrating a circuit structure of a liquid crystal device according to a first embodiment of the invention.
Figure 2:
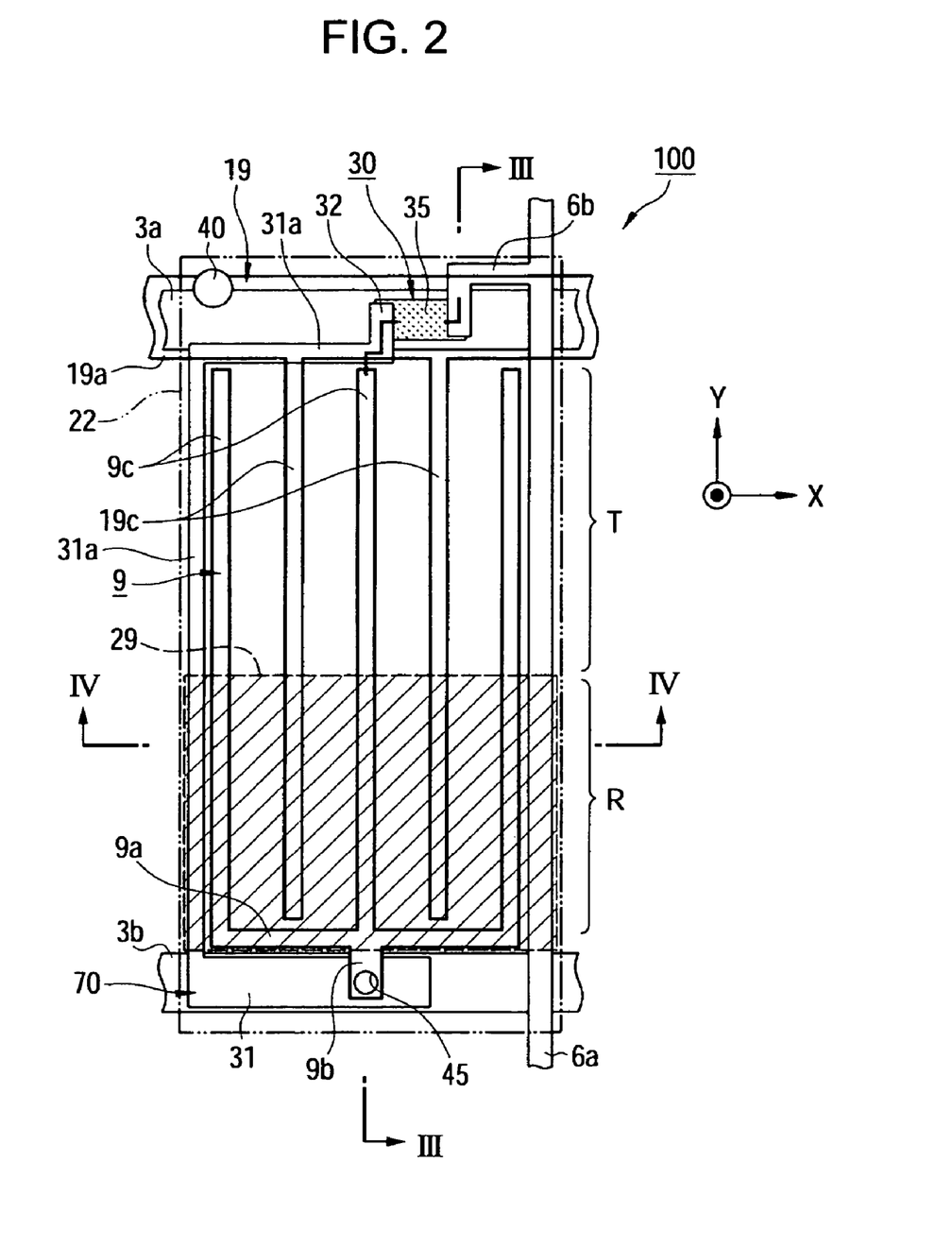
FIG. 2 is a diagram illustrating a planar structure of one dot region.
Figure 3:
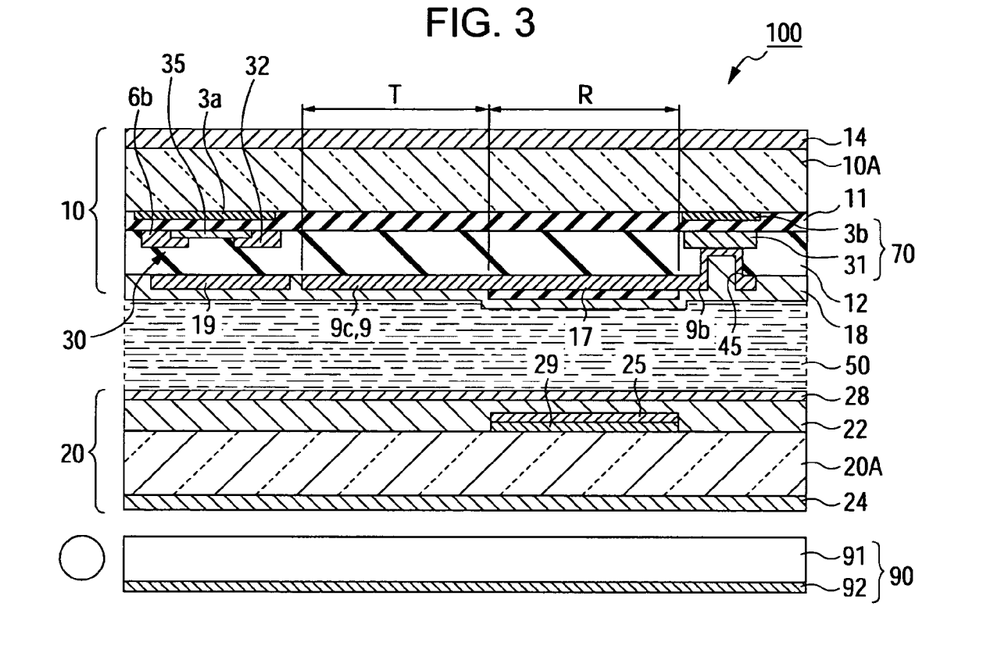
FIG. 3 is a diagram illustrating a sectional structure of the liquid crystal device taken along the line III-III of FIG. 2.
Figure 4:
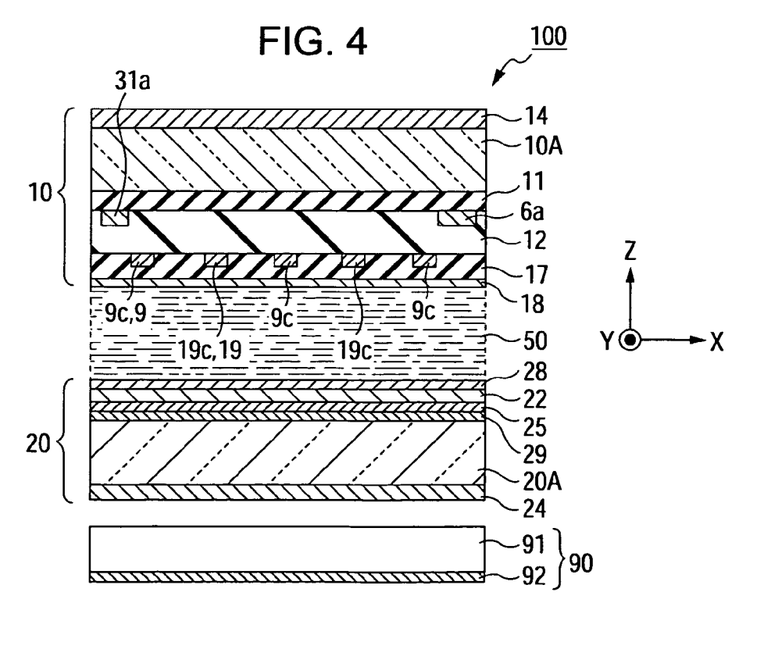
FIG. 4 is a diagram illustrating a sectional structure of the liquid crystal device taken along the line IV-IV of FIG. 2.

FIG. 1 is a diagram illustrating a circuit structure of a plurality of dot regions that are disposed in a matrix so as to constitute the liquid crystal device according to the present embodiment. FIG. 2 is a diagram illustrating a planar structure of one dot region in a liquid crystal device 100. FIG. 3 is a diagram illustrating a partial sectional structure of the liquid crystal device taken along the line III-III of FIG. 2. FIG. 4 is a diagram illustrating a sectional structure of the liquid crystal device taken along the line IV-IV of FIG. 2.

In addition, the scale of each layer or member has been adjusted in order to have a recognizable size in the drawings.

As shown in FIG. 1, in each of the plurality of dot regions that are disposed in a matrix so as to constitute an image display region of the liquid crystal device 100, a pixel electrode 9 and a thin film transistor 30 (hereinafter, referred to as TFT) for switching the pixel electrode 9 are formed, and a data line 6a extending from a data line driving circuit 101 is electrically connected to a source of the TFT 30. The data line driving circuit 101 supplies image signals S1, S2, . . . , and Sn to the respective pixels through the corresponding data lines 6a. The image signals S1 to Sn may be line-sequentially supplied in this order, and may be supplied for each group of a plurality of adjacent data lines 6a.

In addition, the scanning line 3a, which extends from the scanning line driving circuit 102, is electrically connected to a gate of each of the TFTs 30, and scanning signals G1, G2, . . . , and Gm, which are supplied from the scanning line driving circuit 102 to the scanning lines 3a with a predetermined timing in a pulsed manner, are line-sequentially applied to the gate of each of the TFTs 30 in this order. The pixel electrode 9 is electrically connected to a drain of the corresponding TFT 30. The TFTs 30 each serving as a switching element are turned on for a predetermined period through input of the corresponding scanning signals G1, G2, . . . , and Gm, so that each of the image signals S1, S2, . . . , and Sn supplied from the corresponding data lines 6a is written in the pixel electrode 9 with a predetermined timing.

The image signals S1, S2, . . . , and Sn each of which has a predetermined level and is written in the liquid crystal through the pixel electrode 9 are held between the pixel electrodes 9 and the common electrode opposite to the pixel electrodes 9 with the liquid crystal interposed therebetween for a predetermined period. In this case, in order to prevent the held image signal from leaking, a storage capacitor 70 is additionally provided in parallel to a liquid crystal capacitor formed between the pixel electrode 9 and the common electrode. The storage capacitor 70 is provided between the drain of the TFT 30 and a capacitor line 3b.

Next, a detailed structure of the liquid crystal device 100 will be described with reference to FIGS. 2 to 4. As shown in FIG. 3, the liquid crystal device 100 has a structure in which a liquid crystal layer 50 is interposed between a TFT array substrate 10 (first substrate) and a counter substrate 20 (second substrate). The liquid crystal layer 50 is formed between the substrates 10 and 20 by means of a sealant (not shown), which is provided along an outside edge of a region where the TFT array substrate 10 and the counter substrate 20 are opposite to each other. A backlight 90 (illumination device) having an optical waveguide plate 91 and a reflective plate 92 is provided at a rear surface side of the counter substrate 20 (at a bottom surface side in the drawing).

As shown in FIG. 2, in the dot region of the liquid crystal device 100, the pixel electrode 9 (second electrode), which has a substantially comb-like shape in plan view and extends in a Y-axis direction, and the common electrode 19 (first electrode), which has a substantially comb-like shape in plan view and extends in an X-axis direction, are provided. A columnar spacer 40 is provided at a corner of an upper left side of the dot region so as to hold the TFT array substrate 10 and the counter substrate 20 in a state in which they are spaced apart from each other at a predetermined gap.

The pixel electrode 9 has a plurality of strip electrodes 9c (three in the drawing) each of which extends in a Y-axis direction, a base end portion 9a that are connected to lower ends of the plurality of strip electrodes 9c (−Y side) and extends in an X-axis direction, and a connecting portion 9b that extends from the center of the base end portion 9a in an X-axis direction toward −Y side.

The common electrode 19 has a plurality of strip electrodes 19c (two in the drawing) that are alternately disposed together with the strip electrodes 9c of the pixel electrode 9 and extend in parallel to the strip electrodes 9c (Y-axis direction), and a main line portion 19a that are connected to end portion of the strip electrodes 19c toward a +Y side and extends in an X-axis direction. The common electrode 19 is an electrode member that has a substantially comb-like shape formed so as to extend over a plurality of dot regions disposed in an X-axis direction.

In the dot region shown in FIG. 2, a voltage is applied between the three strip electrodes 9c extending in a Y-axis direction and the two strip electrodes 19c disposed among the strip electrodes 9c, so that an electric field (transverse electric field) of an XY surface direction (horizontal direction to a surface of the substrate) is applied to liquid crystal of the corresponding dot region, thereby driving the liquid crystal.

In the dot region shown in FIG. 2, the data line 6a extending in an X-axis direction, the scanning line 3a extending in the Y-axis direction, and the capacitor line 3b, which extends at the periphery of the dot region opposite to the scanning line 3a so as to be parallel to the scanning line 3a, are formed. The TFT 30 is provided at the vicinity of an intersection between the data line 6a and the scanning line 3a. The TFT 30 has a semiconductor layer 35 that is partially formed within a planar region of the scanning line 3a using amorphous silicon, and a source electrode 6b and a drain electrode 32 that are formed so as to partially overlap the semiconductor layer 35 in plan view. The scanning line 3a serves as a gate electrode of the TFT 30 at a location that overlaps the semiconductor layer 35 in plan view.

The source electrode 6b of the TFT 30 has a substantially L shape in plan view such that it branches off from the data line 6a and then extends to the semiconductor layer 35. The drain electrode 32 is electrically connected to a connecting wiring line 31a at an end portion of the drain electrode 32 located at the −Y side. The connecting wiring line 31a extends along the side end of the dot region located at the −X side. In addition, the connecting wiring line 31a is electrically connected to the capacitor electrode 31 provided at the side opposite to the scanning line 3a with the pixel electrode 9 interposed therebetween. The capacitor electrode 31 is a conductive member with a rectangular shape in plan view such that it is formed so as to overlap the capacitor line 3b in plan view. On the capacitor electrode 31, the connecting portion 9b of the pixel electrode 9 is disposed so as to overlap the capacitor electrode 31 in plan view. A pixel contact hole 45 for electrically connecting the capacitor electrode 31 and the pixel electrode 9 is provided at a location where the capacitor electrode 31 and the connecting portion 9b of the pixel electrode 9 overlap each other. In addition, the storage capacitor 70, which uses as an electrode the capacitor electrode 31 and the capacitor line 3b opposite to each other in a thick-wise direction, is formed in a region where the capacitor electrode 31 and the capacitor line 3b overlap each other in plan view.

A color filter 22, which has substantially the same planar shape as the corresponding dot region, is provided in the dot region. In addition, a reflective layer 29 is partially provided in the dot region. The reflective layer 29 is a metallic reflective film, which is made of a light reflective metallic material, such as aluminum, silver or the like. The reflective layer 29 and the color filter 22 are formed on the counter substrate 20 (see FIG. 3). As shown in FIG. 2, in a region where the strip electrodes 9c and 19c are alternately disposed, a region where the reflective layer 29 is formed corresponds to a reflective display region R of the dot region and the other region excluding the reflective display region R corresponds to a transmissive display region T of the dot region.

Next, in the sectional structure shown in FIG. 3, the liquid crystal layer 50 is interposed between the TFT array substrate 10 and the counter substrate 20 disposed so as to be opposite to each other. Polarizers 14 and 24 are respectively disposed on external surfaces of the TFT array substrate 10 and the counter substrate 20 (sides opposite to the liquid crystal layer 50).

The TFT array substrate 10 has, as a base, a light transmitting substrate main body 10A, which is made of glass, quartz, or plastic. At an inner surface of the substrate main body 10A (which faces the liquid crystal layer 50), the scanning line 3a and the capacitor line 3b are formed. In addition, a gate insulating film 11, which is made of a transparent insulating film, such as a silicon oxide film, is formed so as to cover the scanning line 3a and the capacitor line 3b.

The semiconductor layer 35 made of amorphous silicon is formed on the gate insulating film 11, and the source electrode 6b and the drain electrode 32 are provided such that portions of them ride on the semiconductor layer 35. The drain electrode 32 is integrally formed with the connection wring line 31a and the capacitor electrode 31. The semiconductor layer 35 is disposed so as to be opposite to the scanning line 3a with the gate insulating film 11 interposed therebetween, and the scanning line 3a constitutes the gate electrode of the TFT 30 in a region where the semiconductor layer 35 and the scanning line 3a are opposite to each other. The capacitor electrode 31 is disposed so as to be opposite to the capacitor line 3b with the gate insulating film 11 interposed therebetween. As a result, the storage capacitor 70 is formed in which it has the capacitor electrode 31 and the capacitor line 3b as an electrode and has the gate insulating film 11 interposed as a dielectric film between the capacitor electrode 31 and the capacitor line 3b.

An interlayer insulating film 12 made of silicon oxide is formed so as to cover the semiconductor layer 35, the source electrode 6b (data line 6a), the drain electrode 32, and the capacitor electrode 31, and the pixel electrode 9 and the common electrode 19, each of which is made of a transparent conductive material such as ITO or the like, are formed on the interlayer insulating film 12. In addition, a pixel contact hole 45, which reaches the capacitor electrode 31 by penetrating the interlayer insulating film 12, is formed, and a contact portion 9b of the pixel electrode 9 is partially buried in the pixel contact hole 45, so that the pixel electrode 9 and the capacitor electrode 31 are electrically connected to each other. A reflective portion dielectric film 17, which is made of a resin material such as acryl or an inorganic insulating material such as silicon oxide, is formed so as to cover a portion of the pixel electrode 9. The reflective portion dielectric film 17 is formed at a location where it two-dimensionally overlaps the reflective layer 29 formed on the counter substrate 20. An alignment film 18 made of polyimide or the like is formed so as to cover the pixel electrode 9, the common electrode 19, and the reflective portion dielectric film 17.

Next, in the sectional structure of the liquid crystal device taken along the line VI-VI shown in FIG. 4, the strip electrodes 9c of the pixel electrode 9 and the strip electrodes 19c of the common electrode 19 are alternately disposed on the interlayer insulating film 12, and the reflective portion dielectric film 17 is formed so as to cover the strip electrodes 9c and 19c. In this case, if a voltage is applied to the pixel electrode 9 through the TFT 30, a transverse electric field is generated between the strip electrodes 9c and the strip electrodes 19c in an X-axis direction of FIG. 2, so that the liquid crystal of the liquid crystal layer 50 is driven.

In the meanwhile, the reflective layer 29 is partially provided on the inner surface of the counter substrate 20 (which faces the liquid crystal layer 50), and a phase difference layer 25 is formed on the reflective layer 29. The phase difference layer 25 applies a predetermined phase difference to light transmitted through the phase difference layer 25. For example, the phase difference layer 25 applies a phase difference of a ¼ wavelength to the transmitting light. The phase difference layer 25 has a function for preventing the difference in display contrast between transmissive display and reflective display from being generated and a function for improving the display contrast.

The color filter 22 is formed so as to cover the phase difference layer 25, and the alignment film 28 is laminated on the color filter 22. The polarizer 24 is provided on the external surface of the counter substrate 20. As described above, the region where the reflective layer 29 is formed constitutes the reflective display region R, and the region where the reflective layer 29 is not formed constitutes the transmissive display region T.

Preferably, the color filter 22 is constructed so as to have a structure which has two kinds of regions each having different chromaticity in a dot region. Specifically, a first coloring material region is provided so as to correspond to a planar region of the transmissive display region T and a second coloring material region is provided so as to correspond to a planar region of the reflective display region R. In this case, the chromaticity of the first coloring material region is stronger than-that of the second coloring material region. In this way, in the color filter 22, it is possible to prevent the chromacity of the display light from being different from each other between the transmissive display region T, in which the display light transmits once, and the reflective display region R, in which the display light transmits twice. Further, it is possible to make visual qualities between the reflective display and the transmissive display uniform so as to improve the display quality.

Figure 5A:
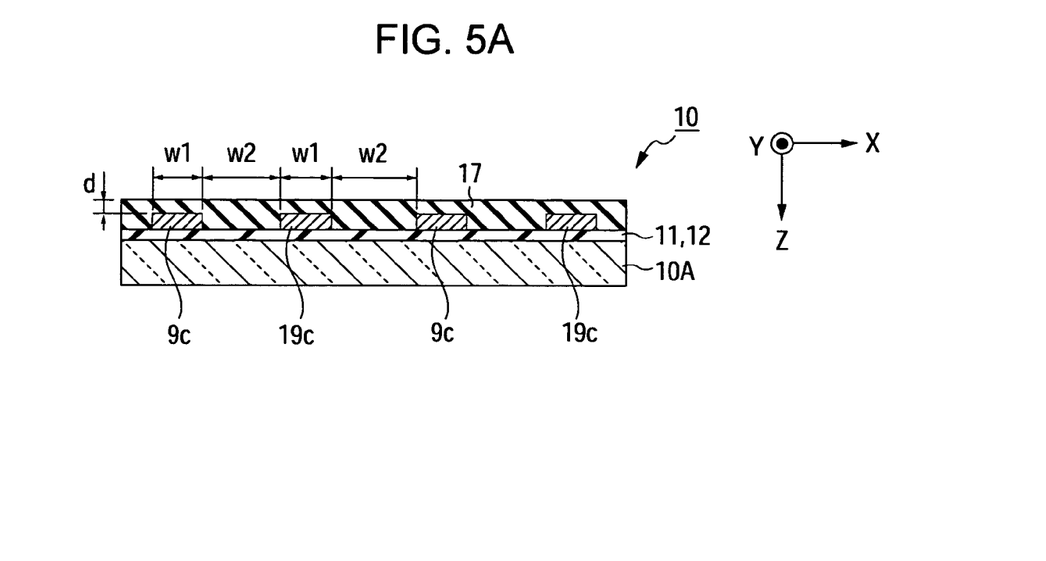
FIG. 5 is a diagram illustrating an effect of the liquid crystal device according to the first embodiment of the invention.
Figure 5B:
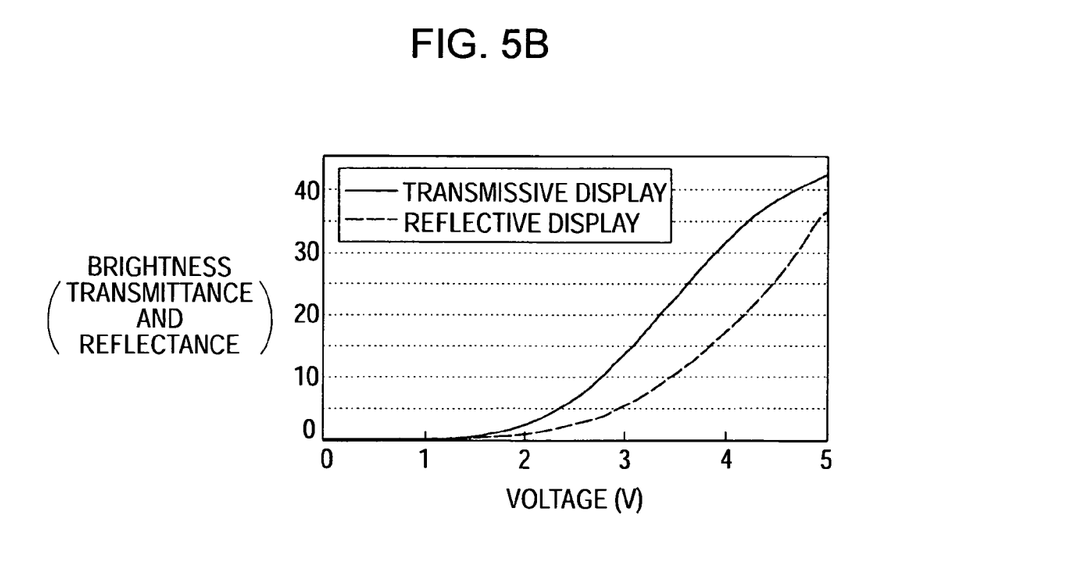

FIG. 5A is a diagram schematically illustrating a sectional structure of the TFT array substrate 10, and FIG. 5B is a diagram illustrating the measured result of an electro-optical characteristic of the liquid crystal device 100. The measured result illustrated in FIG. 5B is a measured result in a case in which a width w1 of each of the strip electrodes 9c and 19c is set to 2 μm, a gap w2 between the strip electrodes 9c and 19c is set to 6 μm, a thickness d of the reflective portion dielectric film 17 is set to 0.5 μm, and a relative dielectric constant $\in$ of the reflective portion dielectric film 17 is set to 3 in a configuration of the TFT array substrate 10 illustrated in FIG. 5A. In addition, the thickness of the liquid crystal layer in the transmissive display region T (cell gap) is 3.5 μm, and the thickness of the liquid crystal layer in the reflective display region R is 3.0 μm (it becomes narrower as much as the thickness of the reflective portion dielectric film 17). The relative dielectric constant $\in_{//}$ of the liquid crystal satisfies the condition $\in_{//}=15.3$, and $\in_{\perp}=4$.

As shown in FIG. 5B, in the liquid crystal device according to the present embodiment, in both the transmissive display and the reflective display, when the applied voltage increases within a range of the voltages generally used in driving the liquid crystal (a range of 1 to 5 V), the transmittance and the reflectance generally increase, so that the difference between the transmittance and the reflectance corresponding to the same voltage decreases.

In the liquid crystal device of the transverse electric field mode, the transmittance/reflectance varies in accordance with a rotational angle of the liquid crystal molecules in a plane by the transverse electric field generated between the electrodes, so that intermediate gray-scale display is performed. Accordingly, when the rotational angle of the liquid crystal molecules is the same in each of the transmissive display region T and the reflective display region R, since the display light transmits the liquid crystal layer 50 twice in the reflective display region R, the phase difference applied to the display light by means of the liquid crystal in the reflective display region R becomes about twice as much as the phase difference applied to the display light by means of the liquid crystal in the transmissive display region T. As a result, the luminance of the dot may be different in each of the transmissive display region T and the reflective display region R. Accordingly, in the liquid crystal device according to the present embodiment, the reflective portion dielectric film 17 is selectively provided on the electrodes 9 and 19 in the reflective display region R, the capacitance between the pixel electrode 9 and the common electrode 19 is different in each of the transmissive display region T and the reflective display region R. That is, the reflective portion dielectric film 17 renders the capacitance between the pixel electrode 9 and the common electrode 19 to be smaller in the reflective display region R than in the transmissive display region T, so that the applied voltage is adjusted such that it is reduced with respect to the capacitance (liquid capacitance) of the liquid crystal layer 50 in the reflective display region R. Thereby, in the liquid crystal layer 50 of the reflective display region R, the rotational angle of the liquid crystal molecules in a plane becomes smaller than that in the transmissive display region T, so that the electro-optical characteristic in the transmissive display is substantially the same as the electro-optical characteristic in the reflective display.

Further, in order to make the electro-optical characteristic uniform in each of the transmissive display and the reflective display, preferably, an effective voltage applied to the liquid crystal layer 50 in the reflective display region R is substantially half of an effective voltage applied to the liquid crystal layer 50 in the transmissive display region T. In this structure, for example, in conditions of the liquid crystal device 100, the relative dielectric constant $\in$ of the reflective portion dielectric film 17 may be set to 4, and the thickness d of the reflective portion dielectric film 17 may be set to 2 μm.

In the liquid crystal device according to the present embodiment having the above-mentioned structure, the reflective portion dielectric film 17 is selectively provided on only the reflective display region R, so that it is possible to make the electro-optical characteristic uniform in each of the transmissive display region T and the reflective display region R. Accordingly, it is possible to cope with a case in which an area ratio between the transmissive display region T and the reflective display region R varies, by only changing a region where the reflective layer 29 is formed without changing the structure of the electrode. In addition, even when the width of each of the strip electrodes 9c and 19c is changed, it does not affect the difference between the electro-optical characteristics in the reflective display and the transmissive display. Accordingly, the width of each of the strip electrodes 9c and 19c can be narrower, so that an opening ratio of the dot region can be improved, thereby achieving brighter display.

Second Embodiment

Next, a second embodiment of the invention will be described with reference to FIGS. 6 and 7. The liquid crystal device according to the second embodiment has the same base structure as the liquid crystal device 100 according to the first embodiment. The liquid crystal device according to the second embodiment has a structure in which the step of the surface of the TFT array substrate 10 caused by the reflective portion dielectric film 17 selectively formed in the reflective display region R can be removed.

FIGS. 6A to 6D are diagrams illustrating a plurality of types in the sectional structure of the TFT array substrate 10 according to the second embodiment of the invention. FIGS. 6A to 6D illustrate only a portion corresponding to the region where the pixel electrode 9 is formed, in the sectional structure of the liquid crystal device taken along the line III-III of FIG. 3. In FIGS. 6A to 6D, the alignment film 18, which is formed so as to cover the pixel electrode 9, the common electrode 19, the reflective portion dielectric film 17 or the like, is not shown. In addition, in FIGS. 6A to 6D, the same constituent elements as those shown in FIGS. 1 to 5 are denoted by the same reference numerals, and the description thereof will be omitted.

First, a type illustrated in FIG. 6A will be described.

Figure 6A:
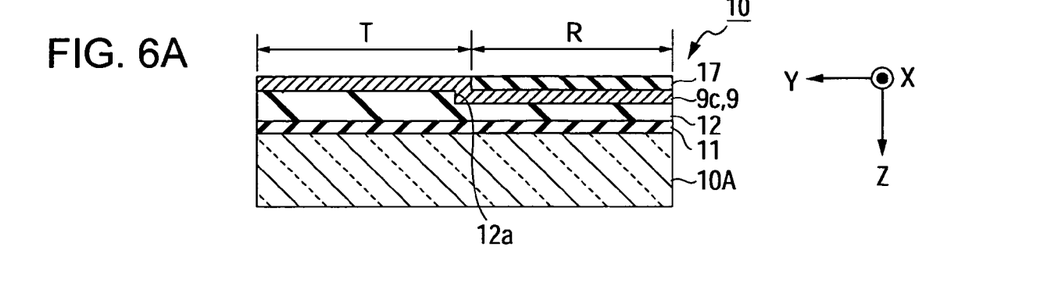
FIG. 6A is a diagram illustrating a structure of a TFT array substrate in a liquid crystal device according to a second embodiment of the invention.

In the TFT array substrate 10 shown in FIG. 6A, the gate insulating film 11 and the interlayer insulating film 12 are sequentially laminated on the substrate main body 10A. A concave portion 12a having the same planar region is provided on a region of the interlayer insulating film 12 corresponding to the reflective display region R, and the pixel electrode 9 (and the common electrode 19) formed on the interlayer insulating film 12 extends in the concave portion 12a. In addition, the reflective portion dielectric film 17 is formed so as to cover the pixel electrode 9 (and the common electrode 19) formed in the concave portion 12a.

In the TFT array substrate 10 having the above-mentioned structure, the concave portion 12a is provided in the interlayer insulating film 12, the pixel electrode 9 and the common electrode 19 of the reflective display region R are formed in the concave portion 12*a*, and the reflective portion dielectric film 17 is formed on the pixel electrode 9 and the common electrode 19. Thereby, as shown in FIG. 3, the step generated between the reflective display region R and the transmissive display region T is removed by the reflective portion dielectric film 17, and the surface of the TFT array substrate 10 toward the liquid crystal layer 50 is planarized. Accordingly, according to the present embodiment, it is possible to effectively prevent the alignment disorder of the liquid crystal from occurring due to the step within the dot region, thereby achieving display with high contrast. Further, it is possible to make the cell gap uniform in the reflective display region R and the transmissive display region T, so that it is possible to exclude the influence of the cell gap on the behavior of liquid crystal. As a result, it is possible to easily make the electro-optical characteristic uniform in each of the reflective display region R and the transmissive display region T by adjusting the thickness of the reflective portion dielectric film 17.

The depth of the concave portion 12*a* is preferably the same as the thickness of the reflective portion dielectric film 17. By adopting this structure, it is possible to improve the flatness of the surface of the TFT array substrate 10, so that the effects can be further achieved.

Figure 6B:
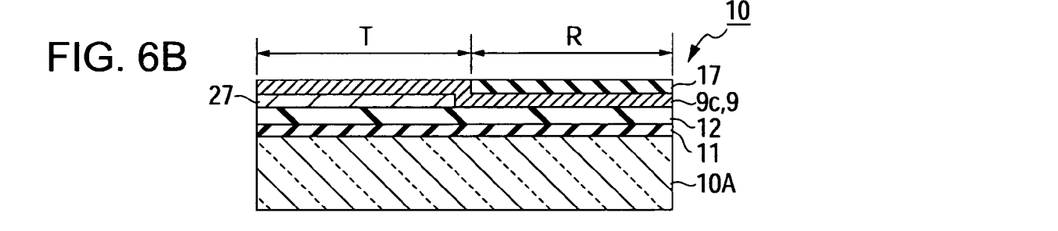
FIG. 6B is a diagram illustrating a structure of a TFT array substrate in a liquid crystal device according to a second embodiment of the invention.

Next, in the TFT array substrate shown in FIG. 6B, the gate insulating film 11 and the interlayer insulating film 12 are sequentially laminated on the substrate main body 10A. A second interlayer insulating film 13 is formed on the interlayer insulating film 12. In the same manner as the above-mentioned reflective portion dielectric film 17, a transmissive portion dielectric film 27 can be formed of an organic insulating material, such as an acrylic resin or the like, and an inorganic insulating material, such as silicon oxide or the like.

The pixel electrode 9 (and the common electrode 19) are formed over the surfaces of the transmissive portion dielectric film 27 and the interlayer insulating film 12. In addition, the pixel electrode 9 and the common electrode 19 are formed such that each of them has a step according to the step formed on the interlayer insulating film 12 by means of the transmissive portion dielectric film 27. In addition, the reflective portion dielectric film 17 is formed so as to cover the pixel electrode 9 and the common electrode 19 of the reflective display region R. Preferably, the transmissive portion dielectric film 27 has substantially the same thickness as the reflective portion dielectric film 17. By adopting this structure, it is possible to improve the flatness of the surface of the TFT array substrate 10.

Even in this structure, since the concave portion having the depth corresponding to the thickness of the reflective portion dielectric film 17 can be formed in the reflective display region R by means of the transmissive portion dielectric film 27 selectively formed in the transmissive display region T, the step caused by the thickness of the reflective portion dielectric film 17 can be prevented from being formed on the surface of the TFT array substrate 10, so that it is possible to prevent the alignment disorder of the liquid crystal from occurring due to the step. Accordingly, in the present type, it is possible to achieve the same effects as the structure illustrated in FIG. 6A.

Figure 6C:
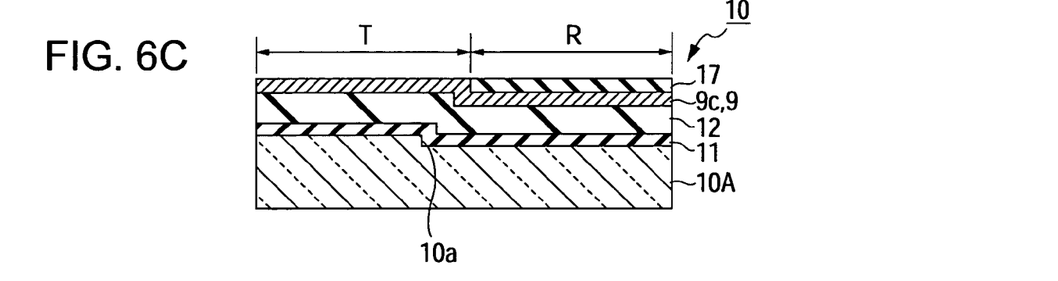
FIG. 6C is a diagram illustrating a structure of a TFT array substrate in a liquid crystal device according to a second embodiment of the invention.

Next, in the TFT array substrate shown in FIG. 6C, the concave portion 10*a* is formed in a planar region of the surface of the substrate main body 10A corresponding to the reflective display region R. In addition, the gate insulating film 11, the interlayer insulating film 12, the pixel electrode 9 (and the common electrode 19) are sequentially laminated on the substrate main body 10A having the concave portion 10*a*.

Each of the gate insulating film 11, the interlayer insulating film 12, and the pixel electrode 9 is formed so as to have a step according to the surface shape of the substrate main body 10A having the concave portion 10*a*. In addition, in the reflective display region R, the reflective portion dielectric film 17 is formed in order to cover the pixel electrode 9 (and the common electrode 19) formed on a step below the surface of the layer in the transmissive display region T. As a result, the surface of the TFT array substrate 10 becomes flat.

Even in this structure, since the step caused by the thickness of the reflective portion dielectric film 17 can be removed by means of the concave portion 10*a* formed on the substrate main body 10A, it is possible to achieve the same effects as the structure illustrated in FIG. 6A.

Figure 6D:
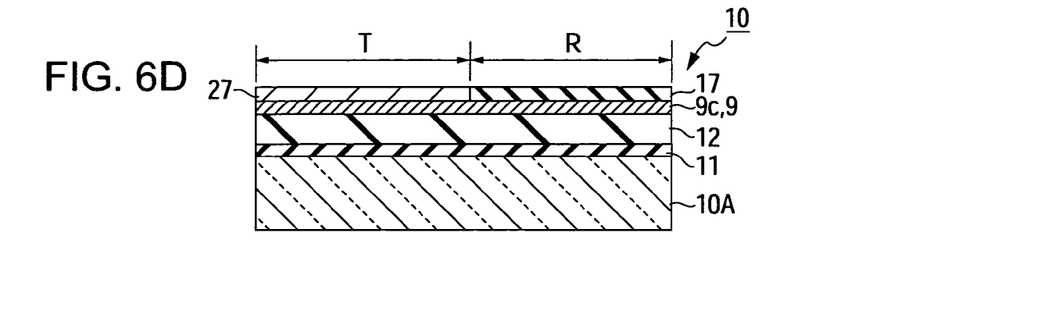
FIG. 6D is a diagram illustrating a structure of a TFT array substrate in a liquid crystal device according to a second embodiment of the invention.

Next, in the TFT array substrate shown in FIG. 6D, the gate insulating film 11, the interlayer insulating film 12, and the pixel electrode 9 (and the common electrode 19) are sequentially laminated on the substrate main body 10A. The transmissive portion dielectric film 27 is formed on a region of the pixel electrode 9 (and the common electrode 19) corresponding to the transmissive display region T and the reflective portion dielectric film 17 is formed on a region of the pixel electrode 9 (and the common electrode 19) corresponding to the reflective display region R. The surface of the transmissive portion dielectric film 27 and the surface of the reflective portion dielectric film 17 exist on the same surface.

Also in this structure, since the surface of the transmissive portion dielectric film 27 formed on the pixel electrode 9 and the surface of the reflective portion dielectric film 17 exist on the same surface, the surface of the TFT array substrate 10 toward the liquid crystal layer 50 becomes flat, and it is possible to achieve the same effects as the structure illustrated in FIG. 6A.

In the structure illustrated in FIG. 6D, a forming material of the reflective portion dielectric film 17 is selected such that a relative dielectric constant $\in_r$ of the reflective portion dielectric film 17 becomes smaller than a relative dielectric constant $\in_t$ of the transmissive portion dielectric film 27, and an effective voltage applied to the liquid crystal layer 50 in the reflective display region R is adjusted such that it becomes smaller than an effective voltage applied to the liquid crystal layer in the transmissive display region T.

Figure 7:
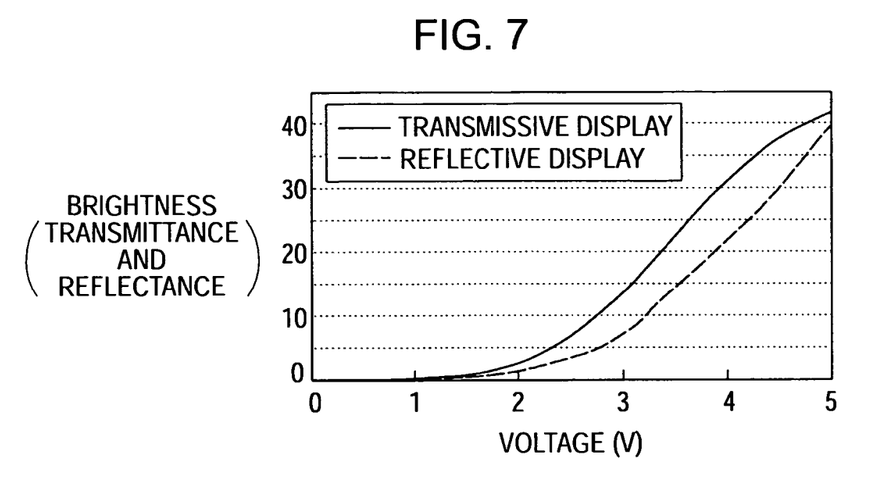
FIG. 7 is a diagram illustrating an effect of the liquid crystal device according to the second embodiment of the invention.

FIG. 7 is a diagram illustrating effects of the liquid crystal device 100 having the TFT array substrate having the structure illustrated in FIG. 6A. Specifically, FIG. 7 is a graph illustrating the measured results about the electro-optical characteristic of the same liquid crystal device 100. In the case in which the electro-optical characteristic illustrated in FIG. 7 is measured, a width w1 of each of the strip electrodes 9*c* and 19*c*, a gap w2 between the strip electrodes 9*c* and 19*c*, a thickness d of the reflective portion dielectric film 17, and a relative dielectric constant of the liquid crystal are the same as those in the case in which the electro-optical characteristic illustrated in FIG. 5B is measured, except that the surface of the TFT array substrate 10 becomes flat.

If the graph illustrated in FIG. 7 is compared with the graph illustrated in FIG. 5B, it can be apprehended that the electro-optical characteristic of the transmissive display does not vary, and a curved line indicating the electro-optical characteristic of the reflective display further moves closely to the curved line indicating the electro-optical characteristic of the transmissive display. Accordingly, as in the present embodiment, if the concave portion 12*a* is provided in the interlayer insulating film 12 and the surface of the TFT array substrate 10 becomes flat, it is possible to further improve the effect which makes the electro-optical characteristic uniform in each of the reflective display and the transmissive display, so that it is possible to further improve the display quality of the liquid crystal device.

Third Embodiment

Next, a third embodiment of the invention will be described with reference to FIGS. 8 to 10.

Figure 8:
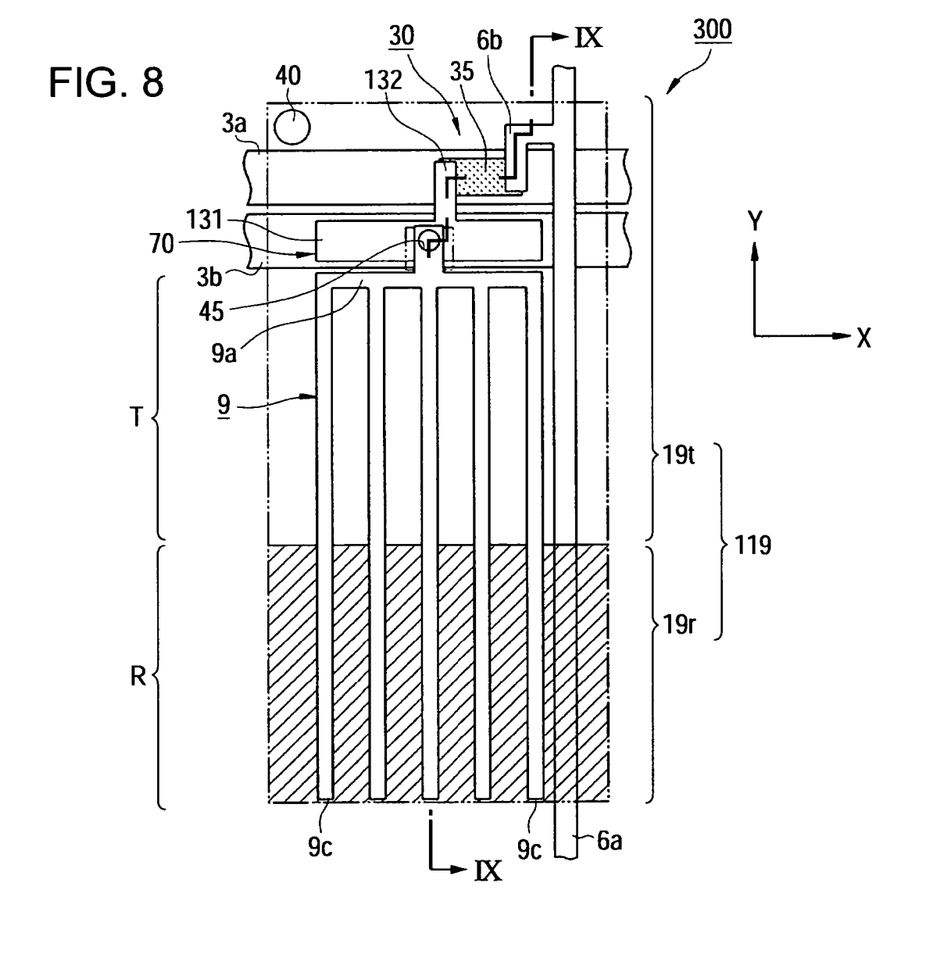
FIG. 8 is a diagram illustrating a planar structure of one dot region of a liquid crystal device according to a third embodiment of the invention.

FIG. 8 is a diagram illustrating a planar structure of one dot region of the liquid crystal device 300 according to the third embodiment of the invention. FIG. 9 is a diagram illustrating a sectional structure of the liquid crystal device taken along the line IX-IX of FIG. 8. FIG. 10 is a diagram schematically illustrating a sectional structure of the TFT array substrate 10 in order to explain the effect in the liquid crystal device 300 according to the third embodiment of the invention.

The liquid crystal device according to the present embodiment is a liquid crystal device that uses a mode called a fringe field switching (FFS) mode among transverse electric field modes in which image display is performed by applying an electric field (transverse electric field) to liquid crystal in a substantially horizontal direction to a surface of a substrate and controlling alignment of liquid crystal molecules. In addition, the circuit structure and the entire structure of the liquid crystal device 300 according to the present embodiment are the same as those of the liquid crystal device 100 according to the first embodiment. In addition, in FIGS. 8 to 10 used so as to explain the present embodiment, the same constituent elements as the liquid crystal device 100 according to the first embodiment illustrated in FIGS. 1 to 4 are denoted by the same reference numerals, and the description thereof will be omitted.

As shown in FIG. 8, in the dot region of the liquid crystal device 300, the pixel electrode 9 (second electrode), which has a substantially comb-like shape in plan view and extends in a Y-axis direction, and the common electrode 119 (first electrode), which is disposed so as to overlap the pixel electrode 9 in plan view and is provided on the entire surface of the corresponding substrate, are provided. A columnar spacer 40 is provided at a corner of an upper left side of the dot region so as to hold the TFT array substrate 10 and the counter substrate 20 in a state in which they are spaced apart from each other at a predetermined gap.

The common electrode 119 has a transparent common electrode 19t and a reflective common electrode 19r disposed in the dot region shown in FIG. 8. In the entire image display region, the transparent common electrode 19t and the reflective common electrode 19r, which extend in an X-axis direction, are alternately disposed in a Y-axis direction. In the present embodiment, the transparent common electrode 19t is a conductive film that is made of a transparent conductive material, such as ITO (indium tin oxide) or the like, and the reflective common electrode 19r, which will be described in detail below, is a reflective layer that is made of a light reflecting metal film, such as aluminum, silver or the like. In addition, the common electrode 119 may have a structure in which the transparent common electrode 19t is formed so as to cover the reflective common electrode 19r, in addition to a structure in which the transparent common electrode 19t and the reflective common electrode 19r are partitioned in plan view, as in the present embodiment.

In the dot region, the data line 6a extending in an X-axis direction, the scanning line 3a extending in the Y-axis direction, and the capacitor line 3b, which is adjacent to the scanning line 3a and extends so as to be parallel to the scanning line 3a, are formed. The TFT 30 is provided at the vicinity of an intersection between the data line 6a and the scanning line 3a. The TFT 30 has a semiconductor layer 35 that is partially formed within a planar region of the scanning line 3a using amorphous silicon, a source electrode 6b that is formed so as to partially overlap the semiconductor layer 35 in plan view, and a drain electrode 132. The scanning line 3a serves as a gate electrode of the TFT 30 at a location that overlaps the semiconductor layer 35 in plan view.

The source electrode 6b of the TFT 30 has a substantially L shape in plan view such that it branches off from the data line 6a and then extends to the semiconductor layer 35. The drain electrode 132 extends toward the −Y side and is electrically connected to the capacitor electrode 131 having a substantially rectangular shape in plane view. The contact portion 9b of the pixel electrode 9 extends from the −Y side so as to be disposed on the capacitor electrode 131, and the capacitor electrode 131 and the pixel electrode 9 are electrically connected to each other through a contact hole 45 formed at a location where the capacitor electrode 131 and the pixel electrode 9 overlap in plan view. In addition, the capacitor electrode 131 is disposed in the plane region of the capacitor line 3b, and the storage capacitor 70, which uses as an electrode the capacitor electrode 131 and the capacitor line 3b opposite to each other in a thick-wise direction, in a region where the capacitor electrode 131 and the capacitor line 3b two-dimensionally overlap each other.

Figure 9:
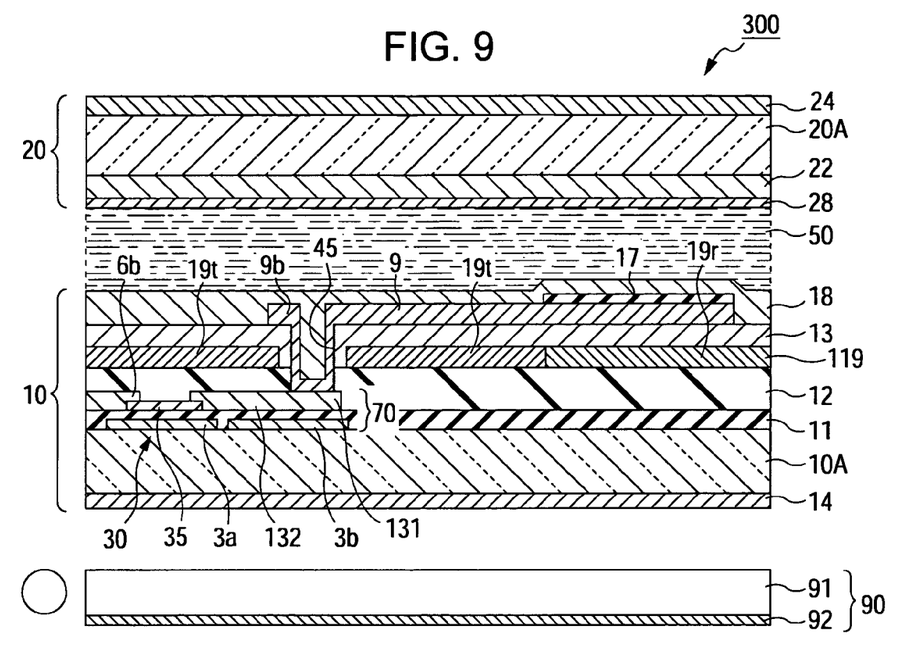
FIG. 9 is a diagram illustrating a sectional structure of the liquid crystal device taken along the line IX-IX of FIG. 8.

Next, in the sectional structure shown in FIG. 9, the liquid crystal layer 50 is interposed between the TFT array substrate 10 and the counter substrate 20 disposed so as to be opposite to each other. The TFT array substrate 10 has, as a base, a substrate main body 10A. At an inner surface of the substrate main body 10A (which faces the liquid crystal layer 50), the scanning line 3a and the capacitor line 3b are formed. In addition, a gate insulating film 11 is formed so as to cover the scanning line 3a and the capacitor line 3b.

The semiconductor layer 35 made of amorphous silicon is formed on the gate insulating film 11, and the source electrode 6b and the drain electrode 132 are provided such that portions of them ride on the semiconductor layer 35. The capacitor electrode 131 is integrally provided at the right side of the drain electrode 132. The semiconductor layer 35 is disposed so as to be opposite to the scanning line 3a with the gate insulating film 11 interposed therebetween, and the scanning line 3a constitutes the gate electrode of the TFT 30 in a region where the semiconductor layer 35 and the scanning line 3a are opposite to each other.

The capacitor electrode 131 is disposed so as to be opposite to the capacitor line 3b with the gate insulating film 11 interposed therebetween. The storage capacitor 70, which uses the gate insulating film 11 as the dielectric film, is formed in a region where the capacitor electrode 131 and the capacitor line 3b are opposite to each other.

A first interlayer insulating film 12 is formed so as to cover the semiconductor layer 35, the source electrode 6b, the drain electrode 132, and the capacitor electrode 131. The common electrode 119, which has the transparent common electrode 19t made of a transparent material, such as ITO or the like, and the reflective common electrode (reflective layer) 19r using as a main body a reflective metal film, such as aluminum, is formed on the first interlayer insulating film 12. Accordingly, in the liquid crystal device 300 according to the present embodiment, of one dot region shown in FIG. 8, a region where the planar region of the transparent common electrode 19t and the planar region including the pixel electrode 9 overlap each other becomes a transmissive display region T that performs the display by modulating the light incident from a backlight 90 for transmitting the liquid crystal layer 50. In addition, a region where the planar region of the reflective common electrode 19r and the planar region including the pixel electrode 9 overlap each other becomes a reflective display region R that performs the display by reflecting and modulating the light incident from the outside of the counter substrate 20 for transmitting the liquid crystal layer 50.

The second interlayer insulating film 13 made of silicon oxide is formed so as to cover the common electrode 119, and the pixel electrode 9, which is made of a transmitting conductive material, such as ITO or the like, is formed on the second interlayer insulating film 13. In addition, a pixel contact hole 45, which reaches the capacitor electrode 31 by penetrating the first interlayer insulating film 12 and the second interlayer insulating film 13, is formed, and a contact portion 9b of the pixel electrode 9 is partially buried in the pixel contact hole 45, so that the pixel electrode 9 and the capacitor electrode 31 are electrically connected to each other. An opening is provided in the common electrode 119 (transparent common electrode 19t) so as to correspond to a region where the pixel contact hole 45 is formed, and the common electrode 119 and the pixel electrode 9 do not come into contact with each other. The reflective portion dielectric film 17 is formed on the pixel electrode 9 so as to correspond to the region where the reflective common electrode 19r is formed. An alignment film 18 is formed on a region above the second interlayer insulating film 13 so as to cover the pixel electrode 9.

Also in the liquid crystal device 300 according to the present embodiment, in the same manner as the liquid crystal device 100 according to the above-mentioned embodiment, a phase difference layer may be provided so as to correspond to the reflective display region R. If this phase difference layer is located between the reflective common electrode 19r and the substrate main body 20A of the counter substrate 20, it may be provided on any layer. For example, the phase difference layer may be provided on the surface of the reflective common electrode 19r and between the pixel electrode 9 and the reflective portion dielectric film 17.

Even in the liquid crystal device 300 having the above-mentioned structure, since the reflective portion dielectric film 17 is formed so as to correspond to the reflective display region R, a capacitance smaller than the capacitance in the transmissive display region T can be applied between the pixel electrode 9 and the common electrode 19 by means of the reflective portion dielectric film 17, and an effective voltage applied to the liquid crystal layer 50 in the reflective display region R can be smaller than an effective voltage applied to the liquid crystal layer 50 in the transmissive display region T. Thereby, the display quality can be improved by making the electro-optical characteristic uniform in each of the transmissive display and the reflective display and making the visual quality uniform in each of the transmissive display and the reflective display, so that the display quality can be improved.

Since the liquid crystal device 300 according to the present embodiment uses an FFS mode and the liquid crystal is driven by means of the electric field generated between the edge of the pixel electrode 9 and the common electrode 119, a variation of the effective voltage applied to the liquid crystal layer 50 with respect to the variation of the thickness of the reflective portion dielectric film 17 is likely to increase, as compared with the liquid crystal device 100 using an IPS mode. FIG. 10 is a diagram schematically illustrating a sectional structure of the TFT array substrate 10 in order to explain the effect of the liquid crystal device according the third embodiment of the invention.

Figure 10:
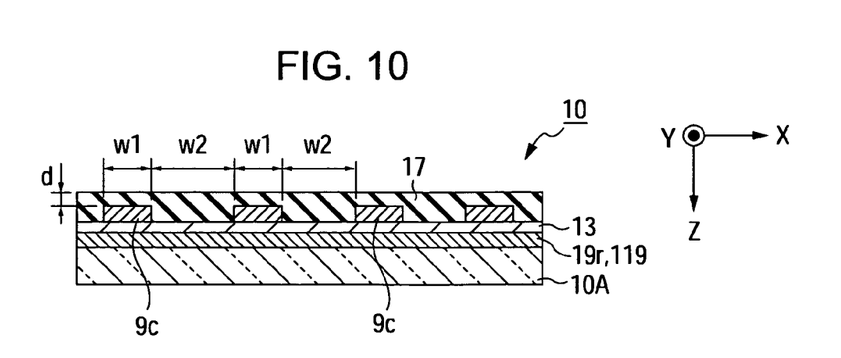
FIG. 10 is a diagram illustrating an effect of the liquid crystal device according to the third embodiment of the invention.

In the structure illustrated in FIG. 10, in a case in which an effective voltage applied to the liquid crystal layer 50 in the reflective display region R is substantially half of an effective voltage applied to the liquid crystal layer 50 in the transmissive display region T by means of the adjustment of the thickness of the reflective portion dielectric film 17, when a width w1 of each of the strip electrodes 9c is set to 2 μm, a gap w2 between the strip electrodes 9c and 9c is set to 2 μm, and a relative dielectric constant of the reflective portion dielectric film 17 is set to 4 μm, the thickness d of the reflective portion dielectric film 17 is 0.4 μm.

In the liquid crystal device according to the present embodiment, the reflective portion dielectric film 17 is selectively provided on only the reflective display region R, so that it is possible to make the electro-optical characteristic uniform in each of the transmissive display region T and the reflective display region R. Accordingly, it is possible to cope with a case in which an area ratio between the transmissive display region T and the reflective display region R varies, by only changing a region where the reflective common electrode 19r is formed and the reflective portion dielectric film 17 without changing the structure of the electrode. In addition, even when the width of each of the strip electrodes 9c is changed, it does not affect the difference between the electro-optical characteristics in the reflective display and the transmissive display. Accordingly, the width of each of the strip electrodes 9c can be narrower, so that an opening ratio of the dot region can be improved, thereby achieving brighter display.

Further, as in the present embodiment, if the electrode arrangement of the FFS mode is adopted, the reflective common electrode 19r serving as the reflective layer is provided at the TFT array substrate 10 side, so that the TFT array substrate 10 can be disposed at the backlight 90 side (rear surface side viewed from an observer). Accordingly, it is possible to prevent the external light from being incident on metal wiring lines, such as the scanning line 3a, the data line 6a, the capacitor line 3b, or the like. As a result, it is possible to prevent the display visibility from being deteriorated due to irregular reflection of the external light on the metal wiring lines.

Electronic Apparatus

Figure 11:
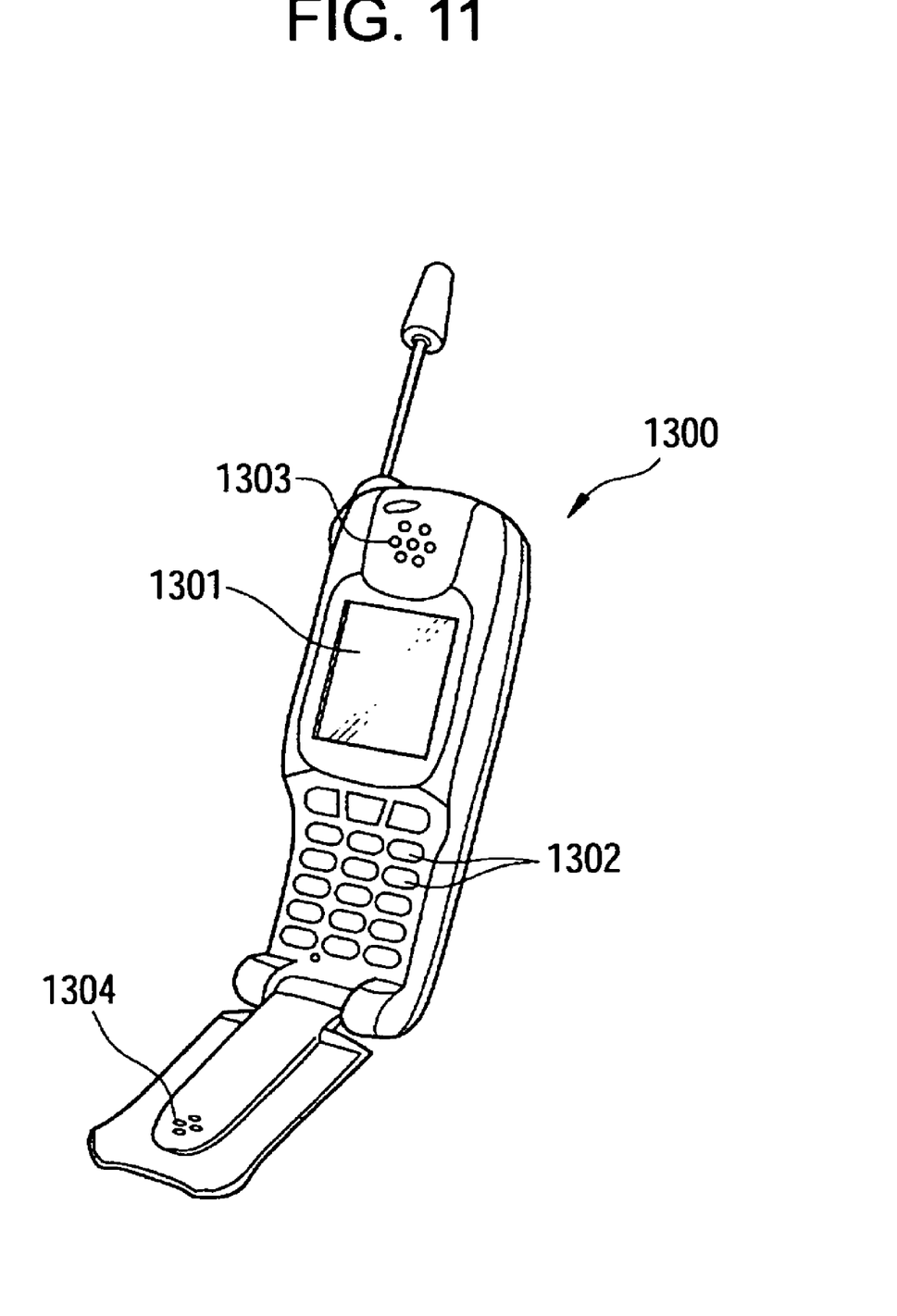
FIG. 11 is a perspective view illustrating a structure of a cellular phone which is an example of an electronic apparatus.

FIG. 11 is a perspective view illustrating a structure of a cellular phone which is an example of an electronic apparatus having the liquid crystal device according to the embodiment of the invention as a display unit. In FIG. 11, a cellular phone 1300 has the above-mentioned liquid crystal device as a small-sized display unit 1301. The cellular phone 1300 further includes a plurality of operation buttons 1302, an earpiece 1303, and a mouthpiece 1304.

The liquid crystal device according to each of the above-mentioned embodiments of the invention is not limited to the display unit of the cellular phone, and may be used as an image display unit of each of an electronic book, a personal computer, a digital still camera, a liquid crystal television, a view-finder-type or monitor-direct-view-type video tape recorder, a car navigation device, a pager, an electronic note, an electronic calculator, a word processor, a work station, a video phone, a POS terminal, an apparatus having a touch panel or the like. In all of the above-mentioned electronic apparatuses, it is possible to achieve the transmissive display and the reflective display with high luminance, high contrast, and wide viewing angle.

The entire disclosure of Japanese Patent Application No. 2005-090719, filed Mar. 28, 2005, is expressly incorporated by reference herein.

What is claimed is:

1. A liquid crystal device in which a reflective display region for performing reflective display and a transmissive display region for performing transmissive display are provided in one dot region, comprising:
    a first substrate and a second substrate disposed so as to be opposite to each other with a liquid crystal layer interposed therebetween;
    a first electrode and a second electrode disposed between the liquid crystal layer and the first substrate, the first and second electrodes applying an electric field to the liquid crystal layer in the one dot region, and
    a reflective portion dielectric film provided between the liquid crystal and at least one of the first electrode and the second electrode in the reflective display region, the reflective portion dielectric film rendering capacitance between the first and second electrodes smaller in the reflective display region than in the transmissive display region.

2. The liquid crystal device according to claim 1, further comprising a transmissive portion dielectric film provided between the liquid crystal layer and at least one of the first electrode and the second electrode in the transmissive display region, the reflective portion dielectric film having a smaller relative dielectric constant than a relative dielectric constant of the transmissive portion dielectric film.

3. The liquid crystal device according to claim 1, wherein the reflective portion dielectric film does not apply a phase difference to light transmitting the corresponding reflective portion dielectric film.

4. The liquid crystal device according to claim 1, wherein a voltage applied to the liquid crystal layer in the reflective display region is approximately half of a voltage applied to the liquid crystal layer in the transmissive display region.

5. The liquid crystal device according to claim 1, wherein the first and second electrodes are arranged to induce an IPS mode.

6. The liquid crystal device according to claim 1, wherein the first and second electrodes are arranged to induce an FFS mode.

7. The liquid crystal device according to claim 1, wherein the reflective portion dielectric film is buried in a concave portion formed on the first substrate.

8. The liquid crystal device according to claim 7, wherein a depth of the concave portion is approximately equal to a thickness of the reflective portion dielectric film.

9. The liquid crystal device according to claim 7, wherein the first substrate is formed by sequentially laminating an interlayer insulating film, the first and second electrodes, and the reflective portion dielectric film on a base, and
    the concave portion is formed on a surface of the interlayer insulating film.

10. The liquid crystal device according to claim 7, wherein the first substrate is formed by sequentially laminating the first and second electrodes and the reflective portion dielectric film on a base, and
    the concave portion is formed on a surface of the base.

11. An electronic apparatus comprising the liquid crystal device according to claim 1.

* * * * *